US008565942B2

(12) United States Patent
Sauvinet

(10) Patent No.: US 8,565,942 B2
(45) Date of Patent: Oct. 22, 2013

(54) METHOD FOR DETERMINING THE SPEED AT WHICH AN AIRCRAFT BREAKS FREE OF THE GROUND EFFECT

(75) Inventor: Frédéric Sauvinet, Tournefeuille (FR)

(73) Assignee: Airbus Operations (SAS), Toulouse Cedex (FR)

(*) Notice: Subject to any disclaimer, the term of this patent is extended or adjusted under 35 U.S.C. 154(b) by 379 days.

(21) Appl. No.: 12/935,744

(22) PCT Filed: Mar. 30, 2009

(86) PCT No.: PCT/FR2009/000360
§ 371 (c)(1),
(2), (4) Date: Sep. 30, 2010

(87) PCT Pub. No.: WO2009/130413
PCT Pub. Date: Oct. 29, 2009

(65) Prior Publication Data
US 2011/0029165 A1    Feb. 3, 2011

(30) Foreign Application Priority Data
Apr. 2, 2008  (FR) ..................... 08 01821

(51) Int. Cl.
*G01C 23/00* (2006.01)
*G06F 17/00* (2006.01)

(52) U.S. Cl.
USPC .............. 701/8; 701/3; 701/4; 701/5; 701/6; 701/14; 701/15

(58) Field of Classification Search
None
See application file for complete search history.

(56) References Cited

U.S. PATENT DOCUMENTS

| 3,659,810 | A | * | 5/1972 | Robertson | 244/76 R |
| 4,705,236 | A | * | 11/1987 | Rudolph | 244/90 R |
| 4,717,097 | A | | 1/1988 | Sepstrup | |
| 5,702,072 | A | | 12/1997 | Nusbaum | |
| 5,901,927 | A | * | 5/1999 | Ho | 244/183 |
| 6,554,229 | B1 | * | 4/2003 | Lam et al. | 244/217 |
| 7,367,530 | B2 | * | 5/2008 | Harrigan et al. | 244/184 |
| 7,883,060 | B2 | * | 2/2011 | Phillips | 244/203 |
| 8,066,228 | B2 | * | 11/2011 | Bender et al. | 244/216 |
| 2009/0230253 | A1 | | 9/2009 | Delaplace et al. | |
| 2011/0054719 | A1 | * | 3/2011 | Sauvinet | 701/4 |

OTHER PUBLICATIONS

Slingerland.pdf (R. Slingerland, Minimum Unstick Speed Calculation for High-Speed Jet Transport Aircraft, 2004, ICAS, 24th International Congress of the Aeronautical Sciences, pp. 1-10).*
PreventTailstrike.pdf (Dave Carbaugh, Tail Strikes: Prevention, QTR 01 07, Aero Quarterly boeing.com/commercial/aeromagazine, pp. 6-13).*
Written Opinion of the International Searching Authority, for International Application No. PCT/FR2009/000360.
"Takeoff", See How It Flies (Oct. 9, 2006). http://web.archive.org/web/20061009033324/http://www.av8n.com/how/htm/takeoff.htm: pp. 1-18.

* cited by examiner

*Primary Examiner* — Khoi Tran
*Assistant Examiner* — Bao Long T Nguyen
(74) *Attorney, Agent, or Firm* — Novak Druce Connolly Bove + Quigg LLP

(57) ABSTRACT

According to the invention, during take-off, the aircraft (AC) is given the tail strike attitude ($\theta_{ts}$) and the ailerons (6G, 6D) are deflected fully downwards.

9 Claims, 3 Drawing Sheets

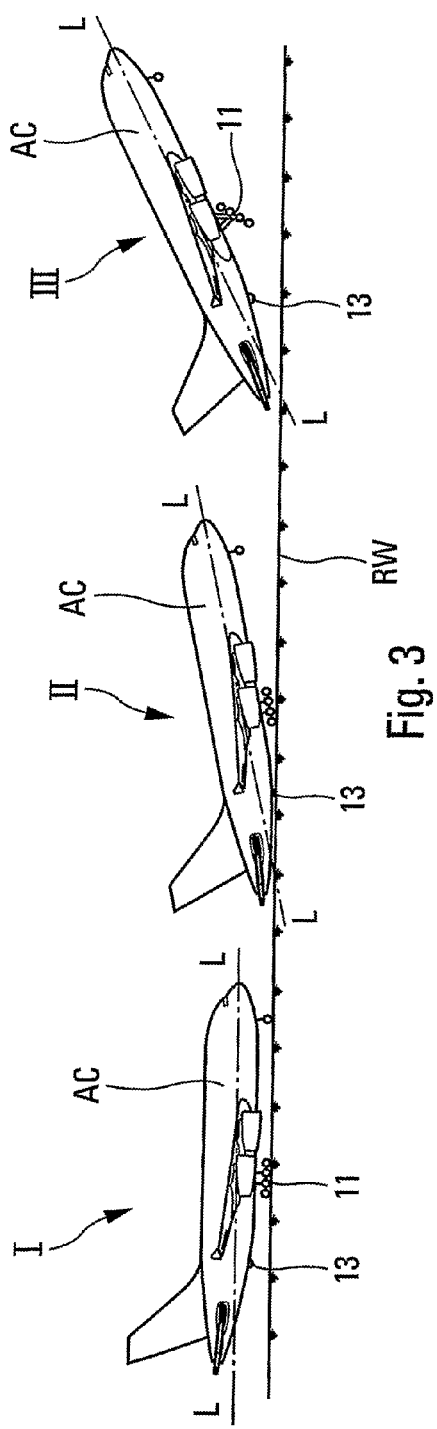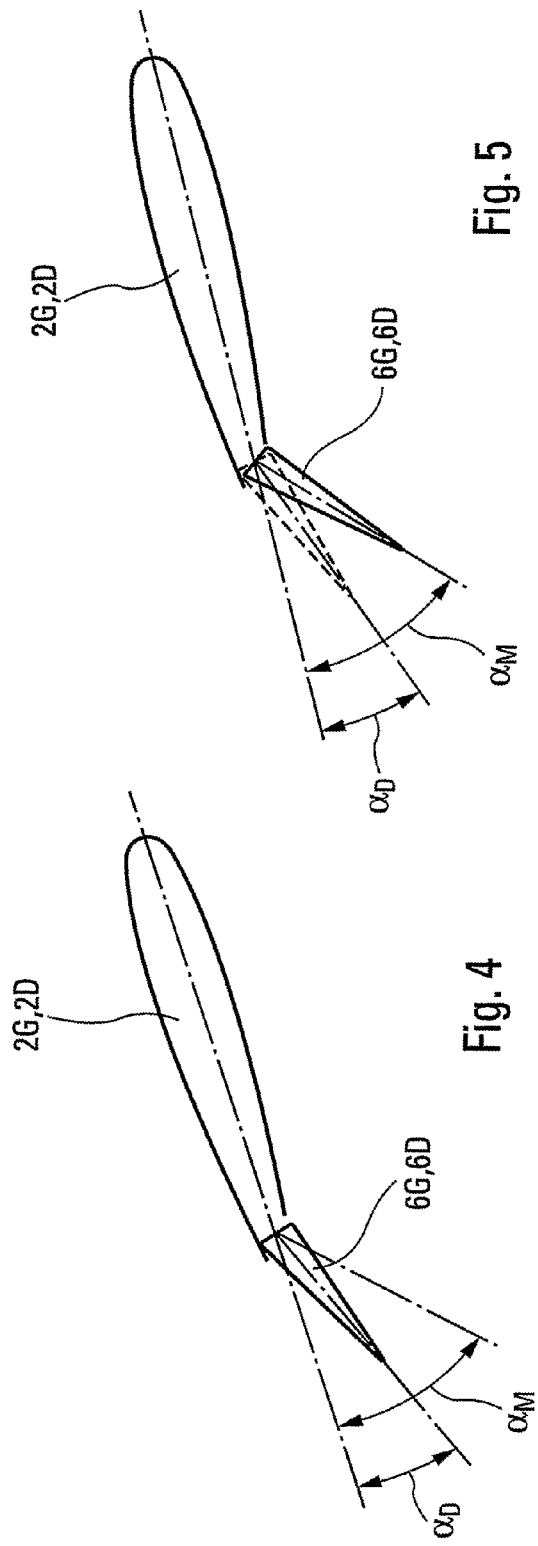

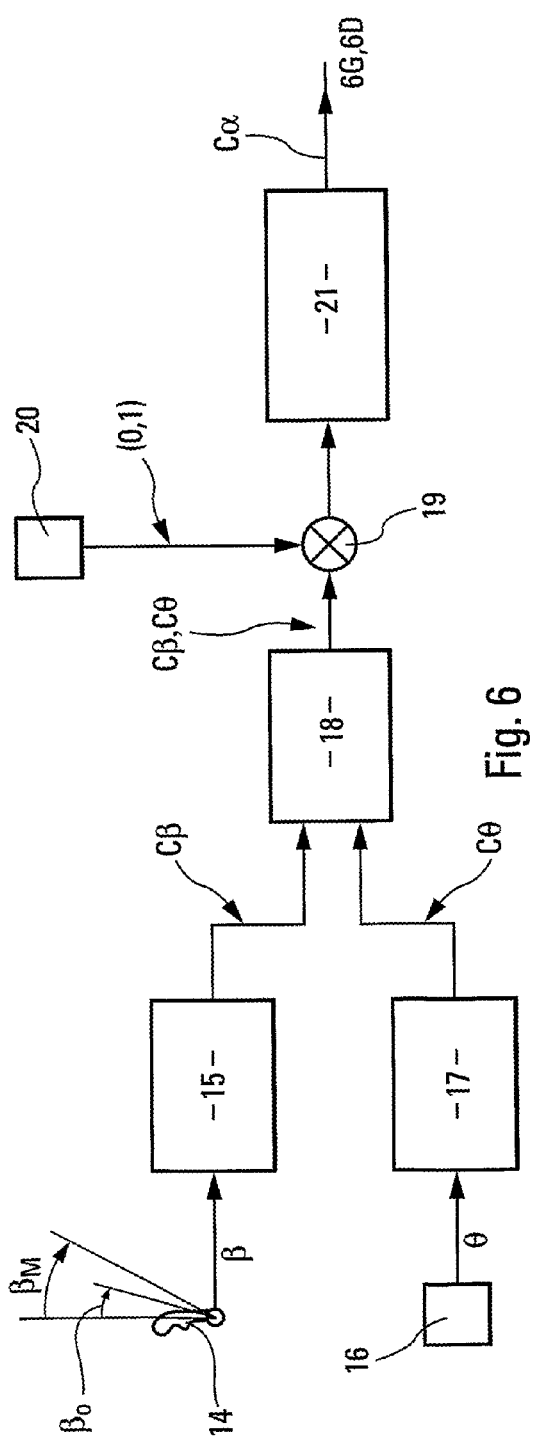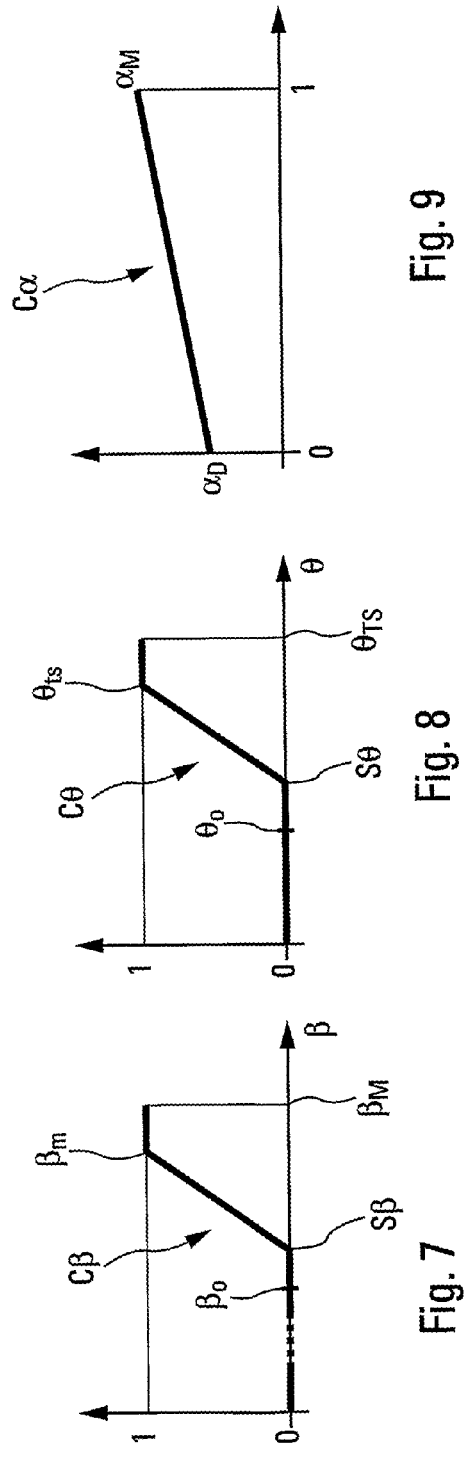

METHOD FOR DETERMINING THE SPEED AT WHICH AN AIRCRAFT BREAKS FREE OF THE GROUND EFFECT

CROSS-REFERENCE TO RELATED APPLICATIONS

This application is a §371 national stage entry of International Application No. PCT/FR2009/000360, filed Mar. 30, 2009, which claims priority to French Patent Application 08/01821, filed Apr. 2, 2008, the entire contents of which are incorporated herein by reference.

FIELD OF THE INVENTION

This invention relates to a method for determining the speed at which an aircraft breaks free of the ground effect (called ground effect release speed further on).

BACKGROUND OF THE INVENTION

It is known that this ground effect release speed (generally referred to by French speaking technicians as VMU speed, for Vitesse Minimum Unstick, and by English speaking technicians as Minimum Unstick Speed) is used in calculating the take-off performance of an aircraft, imposing the runway length being required upon take-off thereof or the take-off mass of such aircraft for a given runway length. Thus, the lower the ground effect release speed is, the better the take-off performance of the aircraft is. There is thus generally some interest to try to minimize such ground effect release speed.

In order to determine the ground effect release speed of an aircraft, it is known to perform a non regular take-off as follows: while said aircraft is rolling down on a take-off runway, accelerating with the main landing gear thereof compressed by the mass of said aircraft and by the ground effect and with the ailerons having a position which is partly deflected downwards in order to maximise the fineness ratio of said aircraft:

by tilting the piloting stick in the nose-up direction, said depth aerodynamic surfaces are deflected upwards for giving said aircraft the attitude for which the tail thereof is brought to strike said take-off runway;

in this tail strike attitude position, the acceleration of said aircraft is carried on until full ballasting-up of said main landing gear; and the speed of said aircraft upon said ballasting-up is noticed, such speed being the desired ground effect release speed.

The depth aerodynamic surfaces used in this method are the horizontal rudders and/or an incidence adjustable stabiliser, generally referred to as either the following abbreviations: PHP. (for Plan Horizontal Réglable in French) or THS (for Trimmable Horizontal Stabiliser). In addition, in order to avoid any damage against the take-off runway, the tail of said aircraft is provided with a protecting pad, at the low point thereof.

SUMMARY OF THE INVENTION

The object of this invention is to improve this known method, in order to minimise the ground effect release speed of the aircraft.

For that purpose, according to the invention, said method for determining the ground effect release speed is remarkable in that, after said upwards deflection of the depth aerodynamic surfaces for giving said aircraft the tail strike attitude and while said main landing gear is still compressed, said ailerons are fully deflected downwards, symmetrically, from their position being partly deflected downwards.

Thus, thanks to this invention, because of such full deflection downwards of said ailerons, the lift of the aircraft is temporarily increased, which aircraft is then at the tail strike attitude thereof, which leads to reducing said ground effect release speed.

Preferably, said full symmetrical deflection downwards of said ailerons is only allowed beyond a tilting threshold of said piloting stick in the nose-up direction, said tilting threshold being at least equal to the take-off tilting which is usually used upon regular take-off.

Similarly, advantageously, said full symmetrical deflection downwards of said ailerons is only allowed beyond a nose-up attitude threshold, the latter being at least equal to the attitude maximum value imposed to said aircraft in order to avoid a tail strike upon rotation in a regular take-off.

In order to prevent the acceleration performance of the aircraft to be reduced at the beginning of take-off, it is required that the full deflection downwards of said ailerons is not performed before the tail strike of the aircraft. Similarly, in order to prevent the ascent performance of the aircraft from decreasing after take-off, it is advantageous that, after ballasting-up of said main landing gear, said ailerons be brought back from the fully deflected downwards position to said partly deflected downwards position.

Besides, it is known that flight control calculators of aircrafts are provided with information relating to the piloting stick tilting and the attitude of the aircraft. It is therefore interesting to implement the method according to the invention in said calculators. For that purpose, the following can be done:

a stick criterion is set, having a value of 0 below said tilting threshold and having a value increasing from 0 to 1 between said tilting threshold and the maximum nose-up threshold of said stick;

an attitude criterion is set, having a value of 0 below said attitude threshold and having a value increasing from 0 to 1 between said attitude threshold and said tail strike attitude; and on the basis of the greater of these two criteria, an aileron deflection criterion is set, which smoothly increases from a value corresponding to the partly deflected position downwards to the value corresponding to the fully deflected position downwards, when said greater criterion switches from the value 0 to the value 1.

Since, in addition, said flight control calculators are provided with information relating to whether the aircraft is on the ground or not, the following can advantageously be done:

a ground criterion is set, which has a value 0 when the aircraft is flying and a value of 1 when the aircraft is on the ground; and said greater of both criteria, that are the stick criterion and the attitude criterion, is multiplied by said ground criterion, before setting said aileron deflection criterion.

Thanks to the preceding elements, the method according to the invention can be easily implemented in said aircraft. The invention therefore relates, in addition, to an aircraft implementing said method of the invention.

BRIEF DESCRIPTION OF THE DRAWINGS

The figures of the appended drawing will help better understand how the invention can be embodied. In these figures, identical references refer to similar elements.

FIG. 3 illustrates, in three successive phases I, II and III, the method according to the invention, the phase represented on FIG. 2 corresponding to phase II of FIG. 3.

FIG. 4 schematically illustrates the position of the ailerons of said jumbo jet during phases I and III of FIG. 3.

FIG. 5 schematically illustrates the position of the ailerons of said jumbo jet during phase II of FIG. 3.

FIG. 6 is the block diagram of the implementation of the method in accordance with this invention.

DETAILED DESCRIPTION

FIGS. 7, 8 and 9 respectively show three criteria used in the block diagram of FIG. 6.

Figure 1:
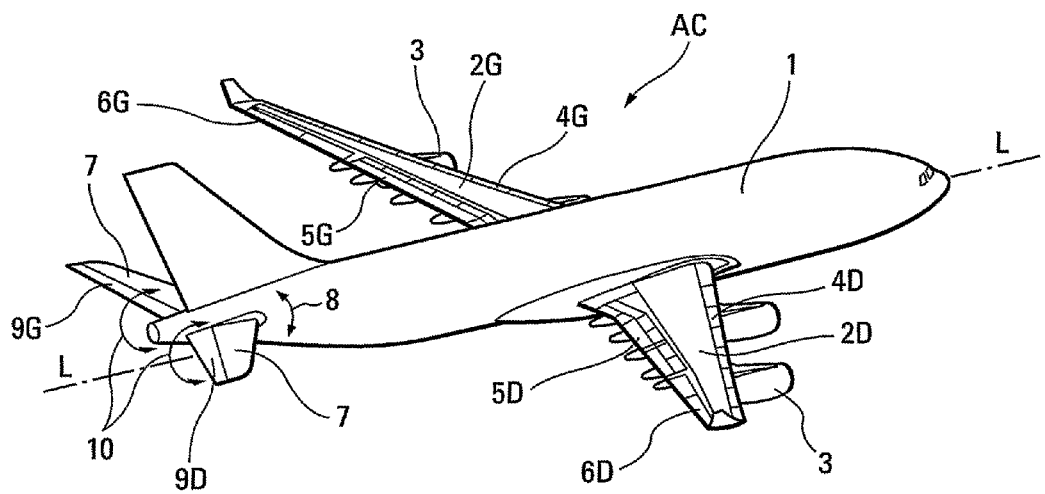
FIG. 1 schematically shows a top rear perspective view of a jumbo jet which can implement this invention.
Figure 2:
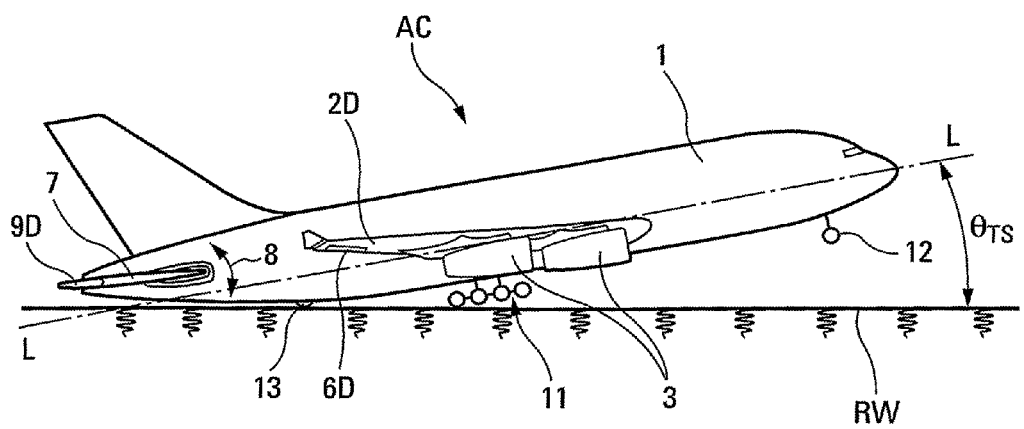
FIG. 2 illustrates a schematic side view of the jumbo jet of FIG. 1 during a phase of the method according to this invention.

On FIGS. 1, 2 and 3, the flaps, slats, control surfaces, ailerons, adjustable horizontal stabiliser, as well as other moving aerodynamic surfaces of the jumbo jet, are depicted in stowed position for the sake of clarity of the drawings. It will be easily understood that during phases I, II and III of FIG. 3, at least some of these surfaces are on the contrary in extended position, although they are represented in stowed position.

The jumbo jet AC, schematically shown by FIGS. 1 and 2, has a longitudinal axis L-L and comprises a fuselage 1 and two symmetrical wings 2G and 2D. Said wings carry engines 3 and a plurality of leading edge slats 4G, 4D and trailing edge flaps 5G, 5D. In addition, at the end of the wings 2G, 2D ailerons 6G and 6D are respectively provided. As schematically shown on FIGS. 4 and 5, said ailerons 6G and 6D are rotatably hinged in the rear portion of said wings 2G and 2D, respectively, with their rotation stroke a downwards being able to take a maximum value $\alpha_M$, as counted from their position for which they are in the extension of the corresponding wing 2G or 2D.

In a rear portion of the fuselage 1, the aircraft AC comprises an incidence adjustable horizontal stabiliser 7, as illustrated by the double arrow 8. On the rear edge of said adjustable horizontal stabiliser 7, horizontal rudders 9G, 9D are respectively hinged, and can rotate with respect to said stabiliser 7, as illustrated by the double arrow 10.

The aircraft AC comprises a main landing gear 11, as well as a front gear 12. In addition, under the fuselage 1, at the place of the tail thereof which is likely to touch the ground during a too tight rotation at take-off, a protecting pad 13 is provided.

FIG. 3 illustrates three phases I, II and III of the method in accordance with this invention.

During phase I, the aircraft AC is rolling down the take-off runway RW while accelerating for take-off. During this acceleration phase I, the leading edge slats 4G, 4D and the trailing edge flaps 5G, 5D are extended as usual (not shown), the adjustable horizontal stabiliser 7 is tilted for a nose-up and the horizontal rudders 9G, 9D are, for example, in their position aerodynamically extending said adjustable horizontal stabiliser 7. In such usual configuration, the assembly of said adjustable horizontal stabiliser 7 and horizontal rudders 9G, 9D generates an aerodynamic force leading to nose-up and producing a pitch moment for nose-up of the aircraft AC, with the configurations of leading edge slats 4G, 4D and trailing edge flaps 5G, 5D allowing the fineness ratio (lift/drag ratio) of the jumbo jet AC to be maximised. As well, in this acceleration phase I, the ailerons 6G and 6D are also used for maximising this fineness ratio and they are symmetrically deflected downwards, as illustrated on FIG. 4. For that purpose, they have a position which is partly deflected downwards, and defined by a value $\alpha_D$ of the stroke $\alpha$, lower than the maximum stroke $\alpha_M$. It would be easily understood that if said ailerons 6G, 6D were deflected by the maximum value $\alpha_M$, they would generate a significant drag, hindering the performance of the aircraft AC during phase I. Of course, in this acceleration phase I, the main gear 11 of the aircraft AC is compressed by the mass thereof and by the ground effect.

During phase II of the method in accordance with the invention (see also FIG. 2), the pilot of the aircraft AC operates the horizontal rudders 9G, 9D and/or the adjustable horizontal stabiliser 7 (not shown) such that these control surfaces 9G, 9D and this horizontal stabiliser 7 altogether generate a force able to nose-up and a pitch moment for nose-up, for giving the aircraft AC an attitude $\theta_{TS}$, such that the pad 13 touches the take-off runway RW. During this tail strike phase II, in order to bring more lift to the aircraft AC and as shown on FIG. 5, the ailerons 6G, 6D are fully deflected downwards, symmetrically, from their partly deflected position downwards defined above by the value $\alpha_D$ of the rotation stroke a. The ailerons 6G, 6D therefore take the maximum deflection position downwards defined by the value $\alpha_M$ of the stroke a.

In the tail strike position of phase II, the aircraft AC proceeds with the acceleration stroke thereof until take-off, as shown by phase III of FIG. 3. Such take-off is detected by the full ballasting-up of the main gear 11 and, upon such ballasting-up, the speed of the aircraft AC is noted, such speed being then the sought ground effect release VMU speed.

It would be easily understood that the extra-lift brought by ailerons 6G, 6D during phase II through their maximum deflection $a_m$ downwards (FIG. 5) promotes the take-off of the aircraft AC and decreases the ground effect release speed with respect to the situation wherein said ailerons 6G, 6D would remain in their partly deflected position of FIG. 4.

It is further noticed that, in order to promote the ascent of the aircraft AC after the lifting phase III, it is required to bring back the ailerons 6G, 6D from their position of maximum deflection downwards, defined by the value $\alpha_M$, to their position of partial deflection downwards, defined by the value $\alpha_D$ and corresponding to the optimum fineness ratio.

Thus, with the preceding elements, it is observed that a fully deflected position downwards of the ailerons 6G, 6D should only be performed during phase II, that is when the aircraft AC is on the ground and has a strong attitude.

The block diagram shown on FIG. 6 helps implementing the method of the invention, while taking into account the fact that, upon a regular take-off (other than a take-off for measuring the ground effect release speed), it is usual:

to position the piloting stick at a predetermined position for nose-up which corresponds to a fraction $\beta_0$, for example equal to ⅔, of the maximum nose-up stroke $\beta_M$ of said stick; and to impose to the aircraft a maximum attitude $\theta_0$ in order to avoid a tail strike during take-off rotation (such maximum attitude $\theta_0$ corresponds, for example, to a distance of 3 feet between the low point of the tail of the aircraft and the runway RW).

The block diagram of FIG. 6 shows:

the piloting stick 14 of the jumbo jet AC generating a signal representative of the nose-up shift angle β thereof;

a logic device 15, receiving said signal β from the stick 14 and turning it into a stick criterion Cβ represented on FIG. 7: the criterion Cβ is null below a threshold Sβ higher than the value $\beta_0$ corresponding to said predetermined position of a regular take-off and increases smoothly beyond said threshold Sβ to reach the value 1 at a value $\beta_M$ which is close to, but lower than the maximum value $\theta_M$;

an attitude sensor 16 (usual on board aircrafts) generating a signal representative of the attitude θ of the jumbo jet AC:

a logic device 17, receiving said signal θ of the attitude sensor 16 and turning it into an attitude criterion Cθ represented on FIG. 8: the criterion Cθ is null below a threshold Sθ higher than said maximum attitude $\theta_0$ and increases smoothly beyond said threshold Sθ to reach the value 1 at a value $\theta_m$ of the attitude θ close to, but lower than, the value $\theta_{TS}$ corresponding to the tail strike;

a voter 18 which receives both criteria Cβ and Cθ and which outputs the greater one;

a multiplier 19 provided at the output of said voter 18;

a sensor 20 able to generate a null signal if the aircraft AC is not on the ground and a signal equal to 1 if the aircraft AC is on the ground (main gear compressed), with the output of the sensor 20 being connected to the multiplier 19, such that the latter outputs the result of the multiplication of the signal generated by the voter 18 by 0 or by 1; and a logic device 21, receiving the result of the multiplication performed by the multiplier 19 and turning it into an aileron deflection criterion Cα, said criterion being equal to said partial deflection value $\alpha_D$ (see FIG. 4) if the output of the multiplier 19 is null and increases smoothly from the value $\alpha_D$ to the maximum value $\alpha_M$ if the output of the multiplier 19 increases smoothly from 0 to 1.

It should be noticed that the logic illustrated by FIGS. 6 to 9 can easily be implemented in the on-board calculators of the aircraft AC which, usually, are provided with information relating to the deflection β of the piloting stick 14, the attitude θ of the aircraft AC and whether the aircraft is on the ground or not.

The invention claimed is:

1. A method for determining the ground effect release speed of an aircraft (AC) provided with at least one piloting stick (14), a main landing gear (11), ailerons (6G, 6D) and depth moving aerodynamic surfaces (7, 9G, 9D), wherein, during take-off, while said aircraft (AC) is rolling down on a take-off runway (RW), accelerating with said main landing gear (11) compressed by the mass of said aircraft and by the ground effect and with said ailerons (6G, 6D) having a partly deflected position ($\alpha_D$) downwards for maximising the fineness ratio of said aircraft, said method comprising:

tilting said piloting stick (14) in the nose-up direction, to deflect said depth aerodynamic surfaces (7, 9G, 9D) upwards for giving said aircraft the attitude ($\theta_{TS}$) for which the tail (13) thereof is brought to strike said take-off runway (RW);

continuing acceleration of the aircraft, in the tail strike attitude position ($\theta_{TS}$), until full ballasting-up of said main landing gear (11);

noting the speed of said aircraft upon said ballasting-up, wherein such speed is the desired ground effect release speed; and after said deflection upwards of depth aerodynamic surfaces (7, 9G, 9D) for giving said aircraft the tail strike attitude ($\theta_{TS}$) and while said main landing gear (11) is still compressed, deflecting said ailerons (6G, 6D) fully downwards ($\alpha_M$), symmetrically, from their partly deflected position ($\alpha_D$) downwards.

2. The method according to claim 1, wherein said full symmetrical deflection downwards of said ailerons (6G, 6D) is only allowed beyond a tilting threshold (Sβ) of said stick (14) in the nose-up direction.

3. The method according to claim 2, wherein said tilting threshold (Sβ) is at least equal to the take-off tilting ($\beta_0$) usually used upon regular take-off.

4. The method according to claim 1, wherein said full symmetrical deflection downwards of said ailerons (6G, 6D) is only allowed beyond a nose-up attitude threshold (Sθ).

5. The method according to claim 4, wherein said nose-up attitude threshold (Sθ) is at least equal to the attitude maximum value ($\theta_0$) imposed to said aircraft in order to avoid a tail strike upon rotation in a regular take-off.

6. The method according to claim 1, further comprising, after ballasting-up of said main landing gear (11), bringing said ailerons (6G, 6D) back from the fully deflected position downwards ($\alpha_M$) to said partly deflected position downwards ($\alpha_D$).

7. The method according to claim 3, for implementation in the flight control calculators of said aircraft (AC) provided with information relating to the tilting (β) of said piloting stick (14) and the attitude (θ) of said aircraft (AC), further comprising:

setting a stick criterion (Cβ), having a value of 0 below said shifting threshold (θ) and having a value increasing from 0 to 1 between said tilting threshold (Sβ) and the maximum nose-up threshold ($\beta_M$) of said stick;

setting an attitude criterion (Cθ), having a value of 0 below said attitude threshold (Sθ) and having a value increasing from 0 to 1 between said attitude threshold (Sθ) and said tail strike attitude ($\theta_{TS}$); and on the basis of the greater of these two criteria (Cβ, Cθ), setting an aileron deflection criterion (Cα) is set, which smoothly increases from a value ($\alpha_D$) corresponding to the partly deflected position downwards to the value ($\alpha_M$) corresponding to the fully deflected position downwards, when said greater criterion switches from the value 0 to the value 1.

8. The method according to claim 7, wherein said flight control calculators are provided with information related to whether the aircraft is on the ground or not, further comprising:

setting a ground criterion, which has a value 0 when the aircraft is flying and a value of 1 when the aircraft is on the ground; and multiplying said greater of both criteria, that are the stick criterion (Cβ) and the attitude criterion (Cθ), by said ground criterion, before setting said aileron deflection criterion (Cα).

9. An aircraft, implementing the method according to claim 1.

* * * * *